United States Patent [19]

Jin-ping

[11] Patent Number: 5,217,302
[45] Date of Patent: Jun. 8, 1993

[54] METHOD AND EQUIPMENT FOR ELECTROMAGNETIC DYNAMIC PLASTICATING EXTRUSION OF POLYMER MATERIALS

[75] Inventor: Qu Jin-ping, Guangzhou, China

[73] Assignee: South China University of Technology, Guangzhou, Switzerland

[21] Appl. No.: 646,163

[22] Filed: Jan. 25, 1991

[30] Foreign Application Priority Data

Feb. 26, 1990 [CN] China .................. 90101034.0

[51] Int. Cl.⁵ .................. B29B 7/36; B29B 7/52
[52] U.S. Cl. .................. 366/79; 264/211.23; 264/349; 264/DIG. 45; 264/211.10; 264/69; 366/273; 425/3; 425/204; 425/381.2; 425/382.3
[58] Field of Search .......... 264/25, 24, 211.1, 211.23, 264/22, 69, 70, 349; 425/376.1, 381.2, 381, 466, 204, 205, 3, 382.3; 366/273, 274, 79, 80

[56] References Cited

U.S. PATENT DOCUMENTS

| | | | |
|---|---|---|---|
| 2,653,351 | 9/1953 | Henning | 425/204 |
| 3,310,835 | 3/1967 | Morozov et al. | 264/211.1 |
| 3,490,097 | 1/1970 | Gould | 425/381 |
| 4,541,793 | 9/1985 | Lindqvist | 425/466 |
| 4,560,521 | 12/1985 | Walling et al. | 264/24 |
| 4,752,138 | 6/1988 | Rufer | 366/273 |
| 4,836,826 | 6/1989 | Carter | 366/274 |

FOREIGN PATENT DOCUMENTS

| | | | |
|---|---|---|---|
| 59-52518 | 3/1984 | Japan | 366/273 |
| 704812 | 1/1980 | U.S.S.R. | 264/211.1 |

Primary Examiner—Jeffery Thurlow
Assistant Examiner—Mathieu Vargot

[57] ABSTRACT

Method and apparatus for the electromagnetic dynamic plasticating of polymer materials includes a magnetic moving body which is supported both axially and radially by a magnetic levitation gap. The magnetic body is rotated in non-steady state vibration within an electromagnetic winding and cooperates with a stationary body to form a processing space for the polymer material.

28 Claims, 1 Drawing Sheet

METHOD AND EQUIPMENT FOR ELECTROMAGNETIC DYNAMIC PLASTICATING EXTRUSION OF POLYMER MATERIALS

1. BACKGROUND OF THE INVENTION

A. Field of the Invention

The present invention relates to a method for electromagnetic dynamic plasticating extrusion to be used in the sphere of processing polymer materials, and the equipment designed for realizing the method.

B. Description of Related Art

Prior to the present invention, the chief equipment used in the processing of polymers was various types of screw extruder. The screw extruder is required to work in a required steady state and the solid material is conveyed entirely by friction. Compaction of material proceeds slowly while the pressure that is established is fairly low and venting of gases inefficient, resulting in low conveying efficiency. Plasticating and melting relies chiefly on exterior heating and heat caused by shearing. The melting rate is low and plastication uneven. Mixing which depends entirely on the process of shearing is not very efficient. Melt pumping depends mainly on the shearing of the melt, and since the material being processed has a high viscosity and elasticity, resistance to melt pumping is fairly high, leading to low pumping rates. Due to the above-mentioned drawbacks in extrusion methods there are limits to increasing output and improving the quality of the extrusion. Due to the high temperatures of extrusion, increase in output is also limited by the slow cooling rate of the attached auxiliary equipment. Besides, it is also difficult to overcome the random disturbances caused by different variables, thus limiting improvement in the quality of extrusion products.

The conventional screw extruder consists of the following systems: power transmission, extruding, heating and cooling and control. The extruding system comprises the screw, which is also the heart of the screw extruder. For a long time, attention has generally been focussed on research in the screw's structure and its mechanisms; therefore its structure has been improved continuously, with the result that there are now many different new types of screw extruder. But, the new screw extruders, whatever their improvements, all have to be fitted with an independent drive motor and power transmission, thus increasing the size of the screw extruder. It also leads to such drawbacks as energy loss during power transmission, leakage of lubricants and pollution, friction and wear of machine parts and noise caused by contact of machine parts and finally poor stress bearing condition. Again, because the screw has a large length to diameter L/D ratio (normally greater than 20) and with increasing requirements on increasing output and improving product quality, the usual method of solving the contradiction between output and quality, using conventional technology, is to increase the L/D ratio of the screw. But increase in L/D ratio is always accompanied by a corresponding increase in the difficulty of screw and barrel manufacture, increased cost of machining and an overall increase in size and weight of the machine. At the same time, the friction and wear between screw and barrel is worsened, which not only directly affects the life of the extruder but also greatly increases energy consumption.

2. SUMMARY OF THE INVENTION

The object of the present invention is to avoid the drawbacks inherent in prior art screw extruder technology, to provide a new method of extrusion which utilizes electromagnetic energy which is applied through a moving magnetic body to provide the various types of energy required for the dynamic plastication of the polymer material and also a new extrusion equipment which does away with the single drive motor and power transmission system of the screw extruder and the conventional screw with large L/D ratio.

Until now there has been no mention in the literature, either Chinese or foreign, of an electromagnetic dynamic method of plasticating extrusion and the relevant equipment for realizing the method. A run-through of the relevant literature by the International Centre For Information of the Guangdong Scientific and Techolological Information Research Institute has also shown that there is no mention of such a method in the literature.

The above-mentioned objectives of the present invention can be realized through the following measures:

The present method utilizes the rotational and pulsed magnetic-field which result respectively from an electromagnetic winding device and axial electromagnetic bearing and the electromagnetic energy which is applied through a metal moving body which revolves and vibrates in the magnetic-field to provide the various types of energy required for the dynamic plastication and extrusion of the polymer material. The extrusion process of material includes, dynamic solids conveying, plasticating mixing and melt pumping. The entire process takes place in a state of periodic oscillation. The frequency and amplitude of oscillation can be adjusted and controlled respectively.

The above-mentioned process works as follows:

1. Dynamic solids conveying

The material is periodically compressed and released, instantaneous pressure causes the material to be compacted rapidly and conveyed. At the same time the entrapped air in the bulk material and volatile matter are rapidly expelled in the process of compaction.

2. Dynamic plasticating mixing

In this part of the process the material undergoes forced vibration, heat dissipation occurs within the material and forced orientation of the molecules takes place simultaneously in a state of dynamic vibration. Intermolecular slipping also occurs and all this results in the uniform and rapid melting of the material. Besides, in a state of vibration, instantaneous changes in shearing rates and pressure cause the material to be mixed, thus quickening and intensifying the blending of the various components and the dissipation of the low molecuar fillers.

3. Dynamic melt pumping

Oscillating vibration lowers the viscosity and elasticity of the melt and flow resistance is correspondingly lowered. Extrusion output increases, extrusion temperature is lowered, extrusion swelling is reduced correspondingly and the random disturbances are modulated by periodical vibration, resulting in a significant increase in the quality of extrusion products.

In order to implement the above-mentioned method, the present invention also provides an electromagnetic dynamic plasticating extruding equipment for the processing of polymer materials. This equipment comprises: lower support base; electromagnetic winding device mounted on the lower support base; electromagnetic bearing fixed to the lower support base; metal moving components encased inside the electromagnetic winding device in line with a common axis, forming with it a radial magnetic levitation gap, and an axial magnetic levitation gap with the electromagnetic bearing; stationary components fixed coaxially to the electromagnetic winding device and together with the moving components forming a processing space communicating with the outside, helical channels for conveying the materials being cut on said moving components or stationary components.

An embodiment of the present invention is further illustrate with reference to the accompanying drawings.

3. BRIEF DESCRIPTION OF THE DRAWING

FIG. 1 diagrammatically illustrates the principles and structure of the electromagnetic dynamic plasticating extruder for polymer materials.

FIG. 2 represents the vertical view of the outer barrel. It shows the four Archimedes spiral grooves.

DESCRIPTION OF THE PREFERRED EMBODIMENT

Figure 1:
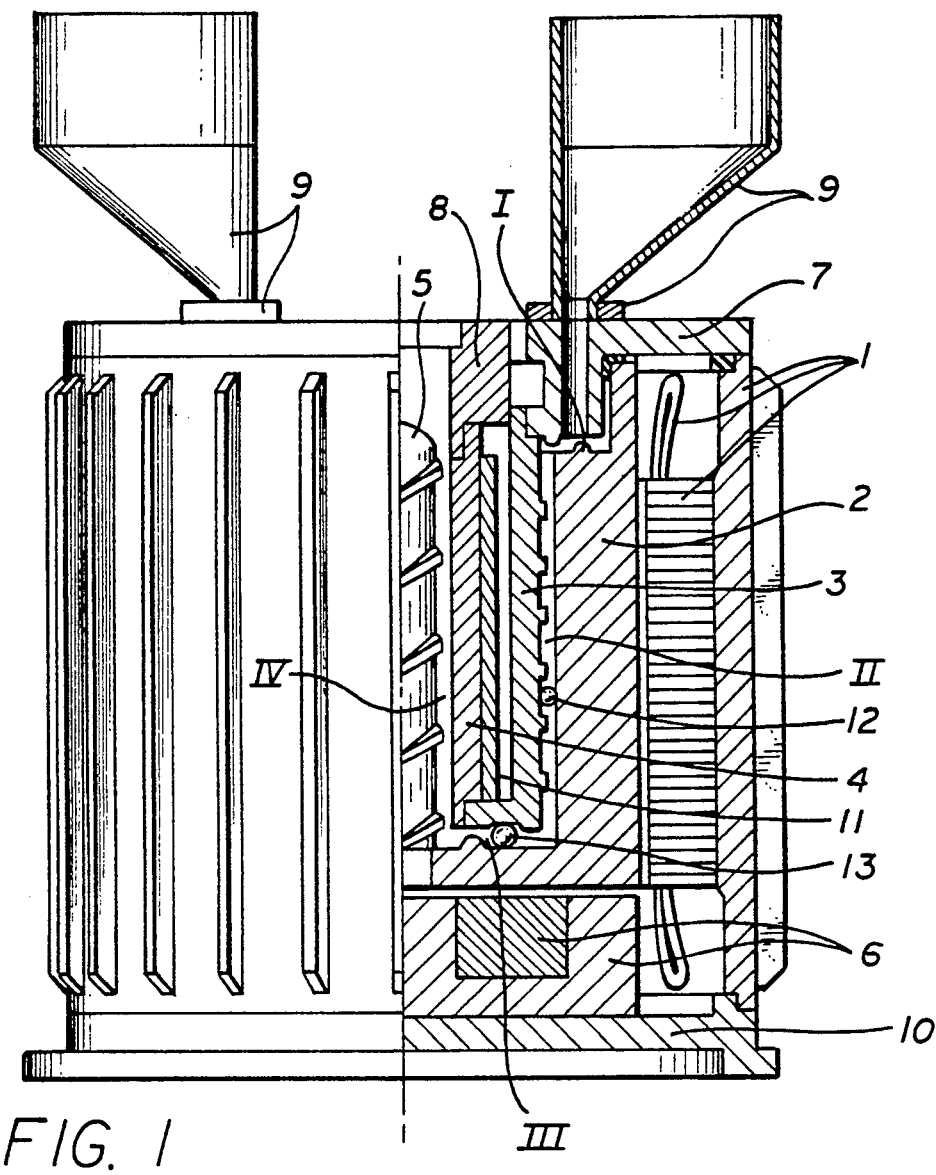
Figure 2:
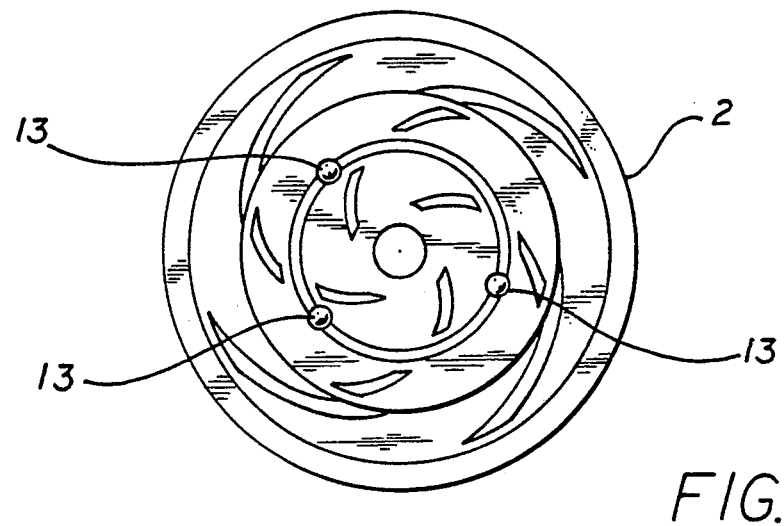

In FIG. 1, represents the electromagnetic winding device mounted on a lower support base 10. An outer barrel 2 is radially supported by magnetic levitation inside the electromagnetic winding device and supported axially by magnetic levitation from the electromagnetic bearing 6 which is fixed to the lower support base 10. There is an electromagnetic gap of 0.5 mm–2 mm between the outer barrel 2 and the electromagnetic winding device 1. An upper bearing end wall 7 is fixed to the electromagnetic winding device 1. The outer screw 3 is fixed to an upper end wall 7 and fitted inside the outer barrel 2; there is a small gap of 0.1 mm–1 mm between the outer barrel 2 and outer screw 3. There is an electromagtic gap of 1.5 mm–3 mm between the outer barrel 2 and the electromagntic bearing 6. An inner barrel 4 is encased inside the outer screw 3 and is fixed to it. There is an auxiliary heating element 11 installed between the inner barrel 4 and the outer screw 3. This heating element only operates before the equipment is started, and stops operating once the equipment is in normal operation. An inner screw 5 is fixed to the center of the lower inner headface of the outer barrel 2 and revolves in synchronism with the outer barrel 2. The inner head face of the upper bearing endwall 7 together with the upper headface of the outer barrel 2 form a processing space designated Zone I which is connected to the two feed hoppers 9 that are mounted symmetrically on the upper endwall 7. In Zone I there are 3-9 Archimedes spiral channels cut on the inner surface of the upper endwall 7 and the upper head face of outer barrel 2, with a small gap of 0.05 mm–0.5 mm between the channel tops and preferably with no friction caused by direct machanical contact taking place. The processing space between the inner surface of the outer barrel 2 and the outer surface of the outer screw 3 is Zone II. On the surface of the outer screw 3 in Zone II there are cut single, double, triple or multiple helical channels. These channels are divided into two or several sections by side plasticating balls 12 used for calendering plastication. The side plasticating balls 12 can only roll and vibrate within the arcuate channels on the periphery of the outer screw 3. The number of side plasticating balls 12 can be zero or between 5-12. The circular space between the bottom head face of outer screw 3 and the lower inner headface of the outer barrel 2 forms the processing space designated as Zone III. The two circular head faces in Zone III have 3-9 Archimdeds spiral channels cut on them and these channels are each divided into two sections by head face plasticating balls 13. The head face plasticating balls 13 can only roll and vibrate within circular channels cut on the surfaces of the bottom head face of the outer screw 3 and the lower inner headface of outer barrel 2. The number of headface plasticating balls 13 can be between 3-10 or zero. The processing space formed by the helical channels between the inner barrel 4 and the inner screw 5 is designated as Zone IV. This Zone is connected to the adaptor 8 which is mounted on the inner barrel 4 and through it connected to various types of dies.

A description of the working process of the machine is given below:

The material from the hoppers enters Zone I and, due to the action of the Archimedes spiral channels is, uniformly spread in a peripheral direction and conveyed to Zone II. In Zone II the material is dynamically conveyed and compacted, resulting in venting of gases, and continuously softened and melted due to the vibration and revolution of the outer barrel caused by electromagnetic action. The side plasticating balls 12 also exert a powerful dynamic calendering force on the material. Because the bottom head face of the outer screw is stationary while the outer barrel revolves, the material is cut, shunted, scraped and mixed when it enters Zone III. In Zone III the material undergoes both dynamic conveying and variable speed mixing by the spiral channels and dynamic calendering caused by the headface plasticating balls 13, becoming as a result thoroughly melted. The melted material then enters Zone IV and is again cut, shunted, scraped and mixed because the inner barrel is stationary while the inner screw revolves synchronously with the outer barrel, and due to the action of the inner screw is then compacted, pumped and metered under a certain temperature through the adaptor to the die.

Compared to prior art extrusion technology, the present invention prossesses the following advantages:

(1) Because of integration of the entire unit, and elimination of the drive motor and power transmission system, a screw with large L/D ratio. The axial dimension of the machine is very small and so is the space that it occupies. Its size and weight is only ⅓ to ¼ of that of a conventional screw extruder with a corresponding output.

(2) The actual manufacture of the present invention when compared to the conventional screw extruder is much simpler, and the time required to manufacture it is also much shorter. The manufacturing costs of the present invention decrease to about ⅓ to ¼ of those of the conventional screw extruder with the same output .

(3) Because the structure is symmetric axially, it bears stress well and can therefore implement high-speed extrusion. In addition, because a large diameter screw is used for dynamic solids conveying, conveying efficiency is consequently very high, resulting in high ouput. On the other hand, because there is no energy loss due to a drive system, and due to dynamic plastication and a low extrusion temperature, and also because a special cooling system is unnecessary, the energy consumption is also low, the energy consumption/output ratio being lower than that of the conventional screw extruder by 40%–60%.

(4) Because a large diameter screw is used for conveying solids and a small diameter screw is used for metering the melt, pressure is established rapidly when solids are conveyed in a state of vibration. Since pressure increases instantaneously, it is beneficial for the venting of gases through the hoppers. Also because the material is repeatedly calendered, cut, shunted, scraped and mixed in a dynamic state, good result are obtained in the venting of gases and also in mixing and plastication. The quality of the extruded products is markedly higher than those produced by a conventional screw extruder.

(5) Because orientation of the polymer molecules is forced to take place under a state of vibration, slipping between molecules takes place easily, the melting and plasticating temperatures are relatively low, so the extrusion temperature is consequently about 20 C.–40 C. lower than those of a conventional screw extruder, thus greatly alleviating the contradiction caused by increasing the output of a conventional screw extruder and the slow cooling rate of the auxiliary equipment.

(6) Because of the short resident time of the material in the equipment and the low temperature of dynamic melt extrusion, stagnation and disassociation do not take place easily, so the equipment can be used for processing a wide range of materials, especially for processing various types of heat-sensitive plastics.

(7) Because all the working components of the present invention are axially symmetric and not under any exterior force or moment of force and the moving parts are at the same time in a state of electromagnetic levitation, therefore the present invention has good stress bearing qualities, low friction wear and as a result a long lifetime.

(8) Because there is no drive motor, power transmission system and machanical bearings, noise is low and there is no pollution caused by lubricants.

What is claimed is:

1. A method for electromagnetic dynamic plasticating extrusion of polymer materials, comprising the processes of solids conveying, melt plastication and mixing and melt pumping, comprising the steps of supporting a magnetic moving body within an electromagnetic winding device and above an electromagnetic bearing, whereby a radial magnetic levitation gap is formed between the moving body and the winding and an axial magnetic levitation gap is formed between the moving body and the bearing and plasticating the polymer material in a processing space between the magnetic moving body and a stationary means by utilizing electromagnetic energy that is applied through the moving magnetic body to rotate the body to provide energy required for the dynamic plastication and extrusion of the polymer material, the entire process taking place in non-steady state vibration.

2. An electromagnetic dynamic plasticating extruder for polymer materials, comprising:
input and output conduit means;
a lower support base (10);
electromagnetic winding means (1) formed about an axis and mounted on the lower support base;
electromagnetic bearing means (6) fixed to the lower support base;
metal moving means generally circumvented by, and movable with respect to, the electromagnetic winding means, the metal moving means being spaced radially from said winding means with respect to said axis by a radial magnetic levitation gap during operation, and being spaced axially from the electromagnetic bearing means during operation to form an axial magnetic levitation gap;
stationary means fixed to the support base and cooperating with the metal moving means to form a processing space communicating with the input and output conduit means; and
means defining helical channels for conveying the materials through at least a portion of the processing space.

3. The extruder of claim 2 wherein said metal moving means includes
an outer barrel (2) generally circumvented by the electromagnetic winding device (1) and formed about a barrel axis.

4. The extruder of claim 3 wherein the metal moving means further includes inner screw means (5) mounted generally coaxially with the barrel axis.

5. The extruder of claim 3 wherein the inner screw means (5) is fixedly mounted to the outer barrel (2).

6. The extruder of claim 2 wherein said stationary means includes
outer screw means (3) fixedly mounted to said electromagnetic winding means, and positioned coaxially therewith to form at least a portion of said processing space in cooperation with said outer barrel (2).

7. The extruder of claim 4 wherein said stationary means includes
outer screw means (3) fixedly mounted to said electromagnetic winding means, and positioned coaxially therewith to form at least a portion of said processing space in cooperation with said outer barrel (2).

8. The extruder of claim 7 wherein the outer screw means is positioned with the outer barrel to define at least a portion of the processing space between its outer surface and the inner surface of the outer barrel.

9. The extruder of claim 8 wherein said stationary means further includes an inner barrel (4) formed about a second barrel axis, and positioned with said second barrel axis generally coaxial with said outer screw means (3) forming with said inner screw means (5) at least a portion of the processing space.

10. The extruder of claim 9 wherein the inner barrel (4) is fixedly connected to the outer screw means (3).

11. The extruder of claim 6, including means (7) for defining a plurality of Archimedes spiral channels through which the processing spaced between the outer screw means (3) and outer barrel (2) communicates with the input conduit, said plurality being in the range of from 3 to 9, inclusive.

12. The extruder of claim 11 including endwall means (7) coupled between the outer screw means (3) and the electromagnetic winding means (1), said endwall means (7) having from 3 to 9 (inclusive) Archimedes spiral channels formed therein to permit communication between the input conduit means and the processing 13. The extruder of claim 10 wherein said outer barrel (2) includes an input end at which material enters, said input end having a headface, said headface having from 3 to 9 (inclusive) Archimedes spiral channels through which the entering material passes.

14. The extruder of claim 13 wherein the spiral channels formed in the outer barrel's headface are separated from the spiral channels formed in the endwall means (7) by a gap in the range of from 0.05 to 0.5 mm.

15. The extruder of claim 9 wherein said outer barrel (2) includes an input end at which material enters, said input end having a headface, said headface having from 3 to 9 (inclusive) Archimedes spiral channels through which entering material passes.

16. The extruder of claim 15 wherein the outer barrel has a second end at which the material exits, wherein said second end includes a second headface, and wherein said second headface includes from 3 to 9 (inclusive) Archimedes spiral channels through which entering material passes.

17. The extruder of claim 11 wherein said outer screw means (3) includes as outer surface cooperating with the surface of said outer barrel to define at least a portion of the processing space, said outer screw means including an end at which material enters, said end having a headface, said headface including from 3 to 9 (inclusive) Archimedes spiral channels through which entering material passes.

18. The extruder of claim 17 including a plurality of plasticating balls (13) movable during operation within the channels between the headface of said outer screw (3) and the second headface of said outer barrel (2).

19. The extruder of claim 6 wherein helical channels are carried on the outer peripheral of said outer screw means (3) to contact the material being processed, said helical channels being selected from the group comprising single, double and multiple helical channels.

20. The extruder of claim 19 including a plurality of side plasticating balls (12) within the peripheral arcuate channels on said outer screw means (3) to divide the helical channels into at least two sections, said balls being movable within the channels during operation.

21. The extruder of claim 20 wherein the number of side plasticating balls (12) is in the range of 5–12 inclusive.

22. The extruder of claim 18 wherein the number of balls (13) is in the range of 3–10, inclusive.

23. AN electromagnetic dynamic plasticating extruder for polymer materials comprising:
   electromagnetic winding means;
   an outer barrel disposed about an outer barrel axis, and vibrationally supported in radial magnetic levitation during operation by said electromagnetic winding means, the barrel having upstream and downstream end portions at which the polymer material respectively enters and exits, the outer barrel having an upstream headface,
   outer screw means disposed about an outer screw axis and positioned within the outer barrel generally co-axially therewith, the outer screw means having upstream and downstream end portions at which the polymer material respectively enters and exits, the outer screw having a downstream headface,
   the outer barrel being rotatable about its respective axis during operation to define a portion of space between the outer barrel and an outer screw wherein polymer material is processed, said processing space portion having helical channels formed therein for conveying the polymer material,
   an electromagnetic bearing means fixed to a support base to provide an axial magnetic levitation gap between the bearing and the outer barrel during operation,
   the upstream headface of the outer barrel having from 3 to 9 spiral channels through which material entering the processing space must pass;
   an inner barrel disposed about an inner barrel axis and substantially encased within, and affixed to, the outer screw means, the inner barrel having upstream and downstream portions at which the polymer material respectively enters and exits; and
   inner screw means disposed along an inner screw axis and affixed generally co-axially within the outer barrel, the inner screw means having upstream and downstream end portions at which the polymer material respectively enters and exits,
   a gap being defined between the exterior of the inner screw means and the interior of the inner barrel to form a portion of the processing space in communication with the space formed between the interior of the outer barrel and the exterior of the inner screw means; and
   input conduit means for permitting the entry of material into the processing space along the upstream headface of the outer barrel and into the processing space,
   the conduit means and the upstream headface of the outer barrel each having a plurality of spiral channels formed therein.

24. The extruder of claim 23 including means for inducing in the electromagnetic field means a variable magnetic field to rotate the outer barrel with respect to the outer screw means.

25. The extruder of claim 23 including means for inducing in the electromagnetic field means a variable magnetic field capable of selectively vibrating at least some of the surfaces forming the processing space in axial and radial directions.

26. The extruder of claim 25 wherein the inducing means is capable of vibrating the processing space surfaces by generally instantaneously variable amounts.

27. The extruder of claims 23, 24 or 25 including from 3 to 10 plasticating balls movable within the spiral headface channels during operation.

28. The extruder of claims 23, 24 or 25 including from 3 to 9 plasticating balls movable within the helical channels of the outer screw means.

* * * * *

UNITED STATES PATENT AND TRADEMARK OFFICE
CERTIFICATE OF CORRECTION

PATENT NO. : 5,217,302
DATED : June 8, 1993
INVENTOR(S) : Jin-Ping

It is certified that error appears in the above-indentified patent and that said Letters Patent is hereby corrected as shown below:

On the title page, Item [73] Assignee:change "Switzerland" to --China--.

Signed and Sealed this

Seventeenth Day of May, 1994

*Attest:*

BRUCE LEHMAN

*Attesting Officer*     *Commissioner of Patents and Trademarks*